United States Patent
Regini et al.

(10) Patent No.: US 11,474,262 B2
(45) Date of Patent: Oct. 18, 2022

(54) UNDERGROUND LINE LOCATOR SYSTEM WITH REAL TIME KINEMATIC AND GLOBAL SATELLITE POSITIONING

(71) Applicant: Metrotech Corporation, Santa Clara, CA (US)

(72) Inventors: Andrzej Zbigniew Regini, Santa Clara, CA (US); William Moore, Santa Clara, CA (US); Stephen John Petherick, Santa Clara, CA (US)

(73) Assignee: METROTECH CORPORATION, Santa Clara, CA (US)

( * ) Notice: Subject to any disclaimer, the term of this patent is extended or adjusted under 35 U.S.C. 154(b) by 10 days.

(21) Appl. No.: 16/880,595

(22) Filed: May 21, 2020

(65) Prior Publication Data

US 2020/0371253 A1    Nov. 26, 2020

Related U.S. Application Data

(60) Provisional application No. 62/851,498, filed on May 22, 2019.

(51) Int. Cl.
*G01S 19/43* (2010.01)
*G01S 19/14* (2010.01)
(Continued)

(52) U.S. Cl.
CPC ............. *G01S 19/43* (2013.01); *G01S 19/14* (2013.01); *G01S 19/36* (2013.01); *G01S 19/47* (2013.01); *G01V 3/081* (2013.01)

(58) Field of Classification Search
CPC .......... G01S 19/43; G01S 19/14; G01S 19/36; G01S 19/47
(Continued)

(56) References Cited

U.S. PATENT DOCUMENTS 6,825,793 B2 * 11/2004 Taylor, Jr. ................. G01V 3/12
                                                               342/22
8,125,379 B2 *  2/2012 Allison ..................... G01C 15/00
                                                               342/357.47
(Continued)

FOREIGN PATENT DOCUMENTS

WO     2017062819 A1    4/2017

OTHER PUBLICATIONS

International Search Report and Written Opinion from PCT/US2020/034209, dated Aug. 27, 2020, pp. 1-26.
(Continued)

*Primary Examiner* — Chuong P Nguyen
(74) *Attorney, Agent, or Firm* — Haynes and Boone LLP.

(57) ABSTRACT

A precise line locator is presented that provides precise line location. The locator includes a housing; a wand attached to the housing, the wand including an array of low frequency antennas arranged along the wand, the array of low frequency antennas defining an electromagnetic locate axis of the line locator system; a real-time kinematic (RTK) Global Navigation Satellite (GNSS) antenna attached to the housing; a user interface positioned in the housing; and a processing circuit coupled to the array of low frequency antennas, the RTK GNSS antenna, and the user interface, wherein the underground line locator determines locate data of the underground line based on signals from the array of low frequency antennas and determines a precise position of the underground line locator from the RTK GNSS antenna.

18 Claims, 9 Drawing Sheets

(51) Int. Cl.
*G01V 3/08* (2006.01)
*G01S 19/47* (2010.01)
*G01S 19/36* (2010.01)

(58) Field of Classification Search
USPC ............... 342/357.26, 357.3, 357.52, 357.76
See application file for complete search history.

(56) References Cited

U.S. PATENT DOCUMENTS

| | | | |
|---|---|---|---|
| 8,188,745 B2* | 5/2012 | Overby | G01V 3/12 |
| | | | 324/326 |
| 8,515,689 B2* | 8/2013 | Li | G01V 3/38 |
| | | | 324/67 |
| 9,703,002 B1* | 7/2017 | Olsson | H01M 10/6562 |
| 10,712,155 B2* | 7/2020 | Howell | G01S 19/14 |
| 10,712,467 B2* | 7/2020 | Vohra | G01V 3/104 |
| 10,768,330 B2* | 9/2020 | Petherick | G01V 3/104 |
| 11,105,627 B2* | 8/2021 | Howell | G01S 19/45 |
| 2009/0128156 A1* | 5/2009 | Li | G01V 3/38 |
| | | | 324/326 |
| 2010/0066603 A1* | 3/2010 | O'Keefe | G01S 1/08 |
| | | | 342/357.27 |
| 2012/0242341 A1* | 9/2012 | Olsson | G01R 19/00 |
| | | | 324/326 |
| 2013/0099790 A1* | 4/2013 | Doany | H01Q 21/24 |
| | | | 343/728 |
| 2015/0355364 A1* | 12/2015 | Bailey | G01V 3/081 |
| | | | 324/326 |
| 2017/0023692 A1 | 1/2017 | Petherick | |
| 2017/0061605 A1* | 3/2017 | Nagashima | G01C 15/002 |
| 2017/0261630 A1 | 9/2017 | Olsson et al. | |
| 2019/0243020 A1* | 8/2019 | Olsson | G01S 17/08 |

OTHER PUBLICATIONS

Examination Report dated Jun. 20, 2022, for India Patent Application 202117057603, 7 pages.

* cited by examiner

UNDERGROUND LINE LOCATOR SYSTEM WITH REAL TIME KINEMATIC AND GLOBAL SATELLITE POSITIONING

RELATED APPLICATION

This application claims priority to U.S. Provisional Application Ser. No. 62/851,498, filed on May 22, 2019, which is herein incorporated by reference in its entirety.

TECHNICAL FIELD

Embodiments of the present invention are related to underground line location and, in particular, to an underground locator system with real-time kinematic and global satellite positioning.

DISCUSSION OF RELATED ART

The process of locating buried utilities (pipes and cables) using low frequency signals is well known and widely adopted as a work practice. Line locating instruments typically include an array of spaced antennas that receive time-varying magnetic field signals generated by the underground utility itself. Such signals can be the result of currents coupled into the underground utility by a separate transmitter or are inherent in the underground utility, for example from power lines. The array of spaced antennas receives the magnetic fields, which are often at specific frequencies. Processing electronics in the line locating instrument determines the relative utility position from the line locating system, including depth, signal currents and other information. Horizontal position and depth of the underground utility, for example, can then be displayed to the user and, in some systems, recorded relative to the position of the line locator.

Increasingly, applications for line locating systems are used in mapping utilities. These mappings of underground utilities are desired to be as geographically accurate as possible. Therefore, there is a need to develop line location systems with highly accurate positional determination.

SUMMARY

According to some embodiments, precise line locator for precise location of an underground line is presented. A precise line locator according to some embodiments includes a housing; a wand attached to the housing, the wand including an array of low frequency antennas arranged along the wand, the array of low frequency antennas defining an electromagnetic locate axis of the line locator system; a real-time kinematic (RTK) Global Navigation Satellite (GNSS) antenna attached to the housing; a user interface positioned in the housing; and a processing circuit coupled to the array of low frequency antennas, the RTK GNSS antenna, and the user interface, wherein the underground line locator determines locate data of the underground line based on signals from the array of low frequency antennas and determines a precise position of the underground line locator from the RTK GNSS antenna.

A method of precisely determining position of an underground line includes locating an underground line at a position with a precise line locator, the precise line locator having an array of low frequency antennas arranged along a wand, the array of low frequency antennas defining an electromagnetic locate axis; placing the precise line locator in a first orientation; determining and logging line location data; placing the precise line locator in a second orientation where a real-time kinematic (RTK) Global Navigation Satellite (GNSS) antenna is positioned to provide a precise position; and determining and logging the precise position with the line location data.

These and other embodiments are discussed below with respect to the following figures.

These figures along with other embodiments are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Recent developments in Satellite Positioning Systems or Global Navigation Satellite System (GNSS) facilitate precision pin-pointing to a true grid reference with a position accuracy of only a few cm. Furthermore, Real Time Kinematic (RTK) can be used in conjunction with geo-spatial information and enhance the position accuracy in real-time—true 'on-the-fly' positioning with a horizontal accuracy of 10 cm RMS (the actual accuracy varies over the surface of the globe, 10 cm is a typical accuracy) or less.

Combining Cable Locating Systems with GNSS to produce survey maps is widely adopted. However, these systems tend to build in inaccuracies. Embodiments according to this disclosure solves a particular problem resulting from the deployment of a GNSS Antenna on a Cable Locating Instrument. In particular, by adding RTK, the inaccuracies involved with determining the position of a located underground line accurately using a GNSS enabled locator can be alleviated.

Figure 1:
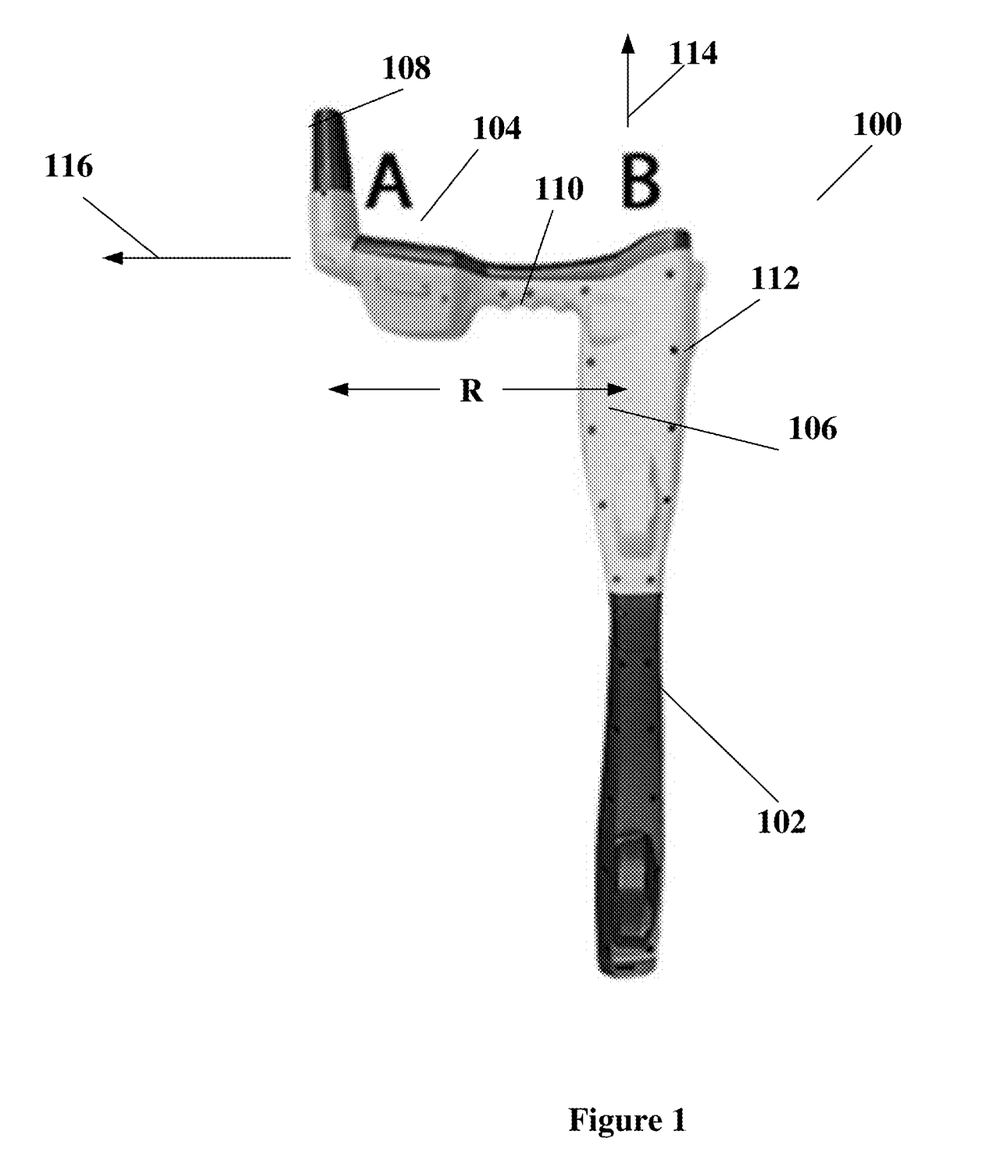
FIG. 1 illustrates a precise underground line locator according to some embodiments.

FIG. 1 illustrates a precision line locator 100, or Cable Locating Instrument, according to some embodiments. The embodiment illustrated in FIG. 1 can include a wand structure 102 that houses the line-location antennas. The line location antennas are arranged along the length of wand structure 102. Wand structure 102 can house any number of line-location antennas that are oriented to measure magnetic fields emanating from an underground in multiple orthogonal dimensions and may be oriented along wand structure 102 for measuring the depth of the underground line. In some embodiments, wand structure 102 may house six (6) antennas. A first set of three antennas are arranged to measure magnetic fields in three orthogonal directions is set at a first position along wand structure 102. A second set of three antennas are arranged to measure magnetic fields in three orthogonal direction and is set at a second position along wand structure 102. Wand structure 102 therefore defines a locating axis 114 which extends along a central axis of the first and second set of antennas housed in wand structure 102. With the configured set of antennas, the time-varying magnetic field can be characterized in three dimensions and the difference in magnetic fields at two separate positions along locating axis 114 of wand structure 102 provides information for determine the depth and orientation of the detected underground line. Typically, the antennas housed in wand structure 102 are designed for low frequency cable detection, a technique that is well known.

Precision line locator 100 further includes an RTK GNSS high frequency antenna 108 for satellite decoding. The RTK GNSS Antenna 108 is a high-fidelity antenna as the requirement is to perform phase sensitive measurements for use in conjunction with RTK systems to determine precise geographical precision measurements of antenna 108.

FIG. 1 further illustrates that precision line locator 100 includes a hand grip 110 that can be used by a user to hold system 100 as a user passes precision line locator 100 over an underground line to be located. Further, precision line locator includes a user interface 104 that receives input from and provides data to the user during use. User interface 104 is conveniently placed in precision line locator 100 for use by the user. Circuitry 106 can further be included in precision line locator 100 to perform operation of line locator 100.

As illustrated in the particular example illustrated in FIG. 1, a housing 112 is provided and shaped for convenience and functionality. Circuitry 106 and user interface 104 can be mounted within housing 112. Hand grip 110 may be formed in the shape of housing 112. RTK GNSS antenna 108 and wand structure 102 is mounted to housing 112. Housing 112 is conveniently shaped to allow a user to handle precision locator 100 while passing locator 100 over an underground line. Housing 112 defines a locator forward axis 116 along housing 112 between locator axis 114 and RTK GNSS antenna 108.

Figure 2:
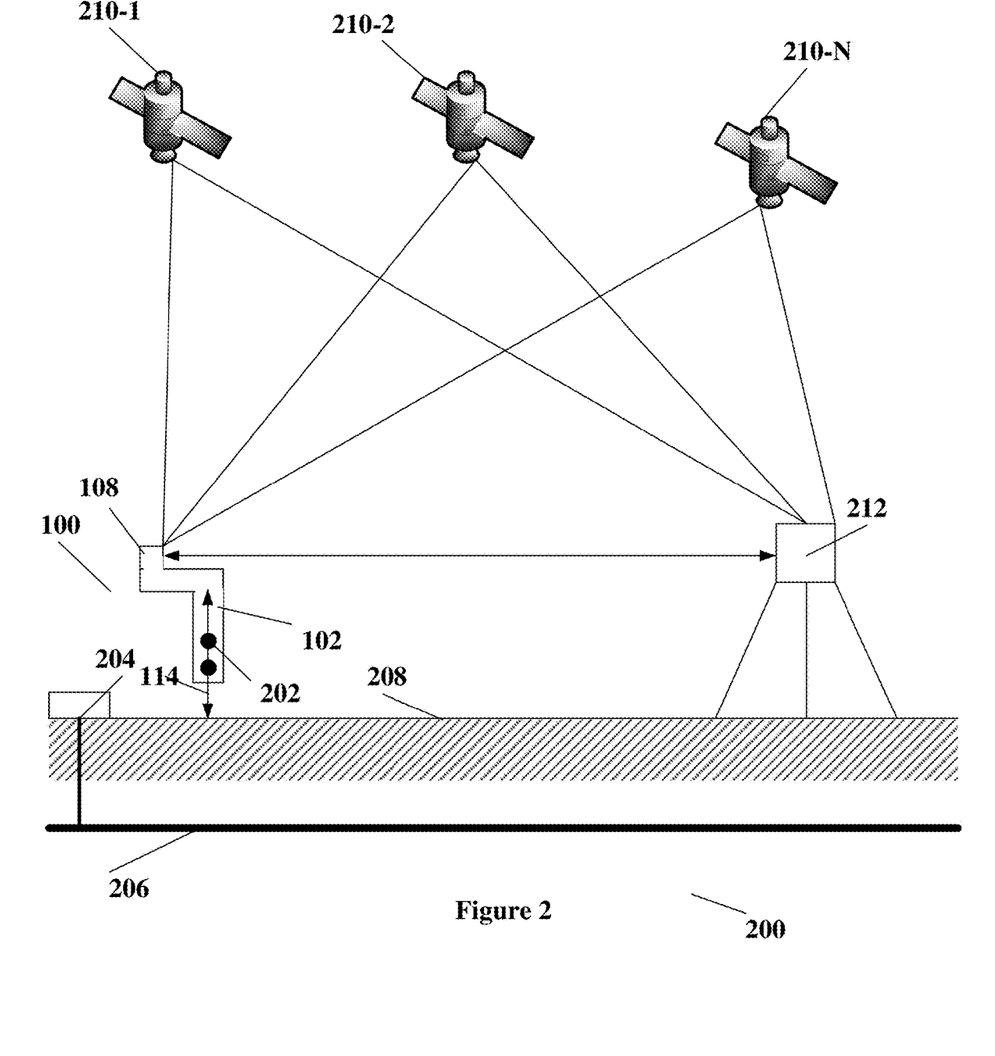
FIG. 2 illustrates operation of a precise underground line locator system using a precision line locator as illustrated in FIG. 1

FIG. 2 illustrates functional operation of a precision line locating system 200 that includes precision line locator 100 according to some embodiments. As illustrated in FIG. 2, precision line locator 100 is positioned over a buried line 206, which is buried a certain distance under surface 208. Buried line 206 is typically coupled to a transmitter 204 that couples an AC signal onto line 206. In some applications, for example power lines, line 206 may carry a signal from another source. In many cases, the AC signal coupled onto line 206 by transmitter 204 can be of a particular frequency that is detected by precision line locator 100. Receiver antennas 202, which are housed in wand structure 102, detect a magnetic field generated by the AC signal on underground line 206. Precision line locator 100 can, using signals from antennas 202 that result from the magnetic fields generated by line 206, determine the position of line 206 relative to locator 100.

In accordance with some embodiments, the precise location of RTK GNSS antenna 108, which is connected to precision line locator 100, is determined by RTK GNSS antenna 108. Consequently, once the position of underground line 206 is located by precision line locator 100, the accurate position of procession line locator 100 is determined by RTK GNSS antenna 108. Consequently, a precise geographic location of line 206 can be determined and recorded. Mapping of line 206 can be performed by determining the precise geographic location of line 206 over a number of locations over line 206.

Real-time kinematic (RTK) positioning refers to a satellite navigation technique sued to enhance precision positioning data at RTK GNSS antenna 108. RTK positioning employs a stationary receiver 212 that is in combination with RTK GNSS antenna 108. Each of stationary receiver 212 and RTK GNSS receiver 108 are in communications with a plurality of global positioning satellites 210, of which satellites 210-1 through 210-N are illustrated.

As is well known, the distance between a receiver such as stationary receiver 212 or receiver 108 can be determined by calculating the time it takes for a signal to reach the receiver from the satellite. This delay can be calculated based on information transmitted in the satellite signal. The calculation of the distance between the receiver and a number of satellites, and the known locations of the satellites, allows for an accurate location determination of the receiver. However, the accuracy that can be achieved is limited to a meter or more, depending on conditions that can include, for example, travel times based on atmospheric conditions or other interference with the signals.

RTK positioning follows the same general concept, but uses the carrier signal from each of satellites 210-1 through 210-N along with stationary receiver 212 to provide positional accuracies of 1 cm or less. In particular, RTK uses the carrier wave of the satellite signal from each of satellites 210-1 through 210-N to refine the location of the base station 212. Base station 212 determines a correction to the position located by conventional methods and by determination based on phase shifts of the carrier wave and sends the positional correction to RTK GNSS receiver 108. In particular, each of RTK GNSS 108 and base station 212 measures a phase difference and RTK GNSS 108 receives the phase difference measured by base station 212 to compare with the phase difference determined by its measurement to determine a correction.

Consequently, RTK GNSS antenna 108 is used with a system that uses real-time kinematic techniques rather than code-based positioning of standard global positioning. RTK is a technique that uses carrier-based ranging and provides ranges (and therefore positions) that are orders of magnitude more precise than those available through code-based positioning.

In practice, the RTK system uses a single base-station receiver 212 located at a known location along with a mobile station, which in this application is RTK antenna 108 of precision locating system 100. Base station 212 rebroadcasts the phase of the carrier that it observes, and RTK antenna 108 compare its own phase measurements with the one received from the base station. This allows RTK antenna 108 of precision locating system 100 to calculate its relative position with respect to base station 212 to a high accuracy, in some cases to within millimeters. The actual location then is accurate to within the accuracy of the location of base station 212, often to within 1 centimeter±1 ppm horizontally and within 2 centimeters±1 ppm vertically. This translates to an accuracy of ±1 cm over a kilometer. In some embodiments, base station 212 may be one of the public RTK NTRIP (Networked Transport of Radio Technical Commission for Maritime Services (RTCM) via Internet Protocol) Base Stations. Such accuracy is highly valuable when incorporated in precision line location system 100 for mapping the location of underground utilities.

The position of the RTK GNSS Antenna 108 on locator system 100 can be very important for operation of precision line locator system 100. Although RTK GNSS antenna 108 can be mounted anywhere on housing 112 of precision line locator system 100, for good operation RTK GNSS Antenna 108 may be positioned to have a clear uninterrupted view of the sky. If RTK GNSS Antenna 108 is obstructed, a precision location fix may not be possible. Consequently, in many embodiments, RTK GNSS Antenna 108 is mounted a distance R from locating axis 114.

Some existing application of GNSS receivers involve mounting the receiver on a high extension mast that places the receiver above an operator's head. However, such an arrangement would not function well with a line location system as it is very awkward to handle. Although not previously incorporated into line location systems, RTK GNSS receivers have been used in system such as surveying equipment. Those systems use a high extension mast to ensure the RTK GNSS Antenna is above head height of any user. Such systems work well but are awkward and impractical for use in a cable locator system.

Although placement of RTK GNSS antenna 108 at a position on housing 112 that is directly aligned with locating axis 114 of wand 102 (position B indicated in FIG. 1), which is in alignment with antennas 202, that position may not be ideal. Placing RTK GNSS antenna 108 at position marked 'B' in FIG. 1 may result in significant obscuration of the sky due to the relative position of the user, an effect referred to as 'human shadowing' in common parlance. Although impractical, position B ensures that RTK GNSS Antenna 108 is aligned on the same vertical axis as locator's intrinsic electro-magnetic axis indicated as locate axis 114 (defined by the array of low frequency antennas 202), this position results in obscuring RTK GNSS antenna 108 that may negatively affect the precise location function of locator 100, or may even make line locator 100 inoperative as a precision line locator.

Consequently, in embodiments according to this disclosure, RTK GNSS antenna 108 is placed in a location on housing 112 where it has a clear view of the sky and is not likely to be shadowed by an operator of line locator 100 while the operating is handling line locator 100 by grip 110. As illustrated in FIG. 1 locate RTK GNSS antenna 108 can, for example, be connected at position A of housing 112 on precision line locator 100. Taking the above points into consideration leads to the conclusion that position 'A' is a viable option and has only a minor impact on the overall ergonomics for operating precision line locator 100. However, placing the RTK GNSS Antenna 108 at position 'A' creates another intrinsic error which will be discussed further below. Namely, RTK GNSS antenna 108 is off the electromagnetic locator axis 114 of precision line locator 100 as defined by antennas 202 mounted in wand 102.

Figure 3:
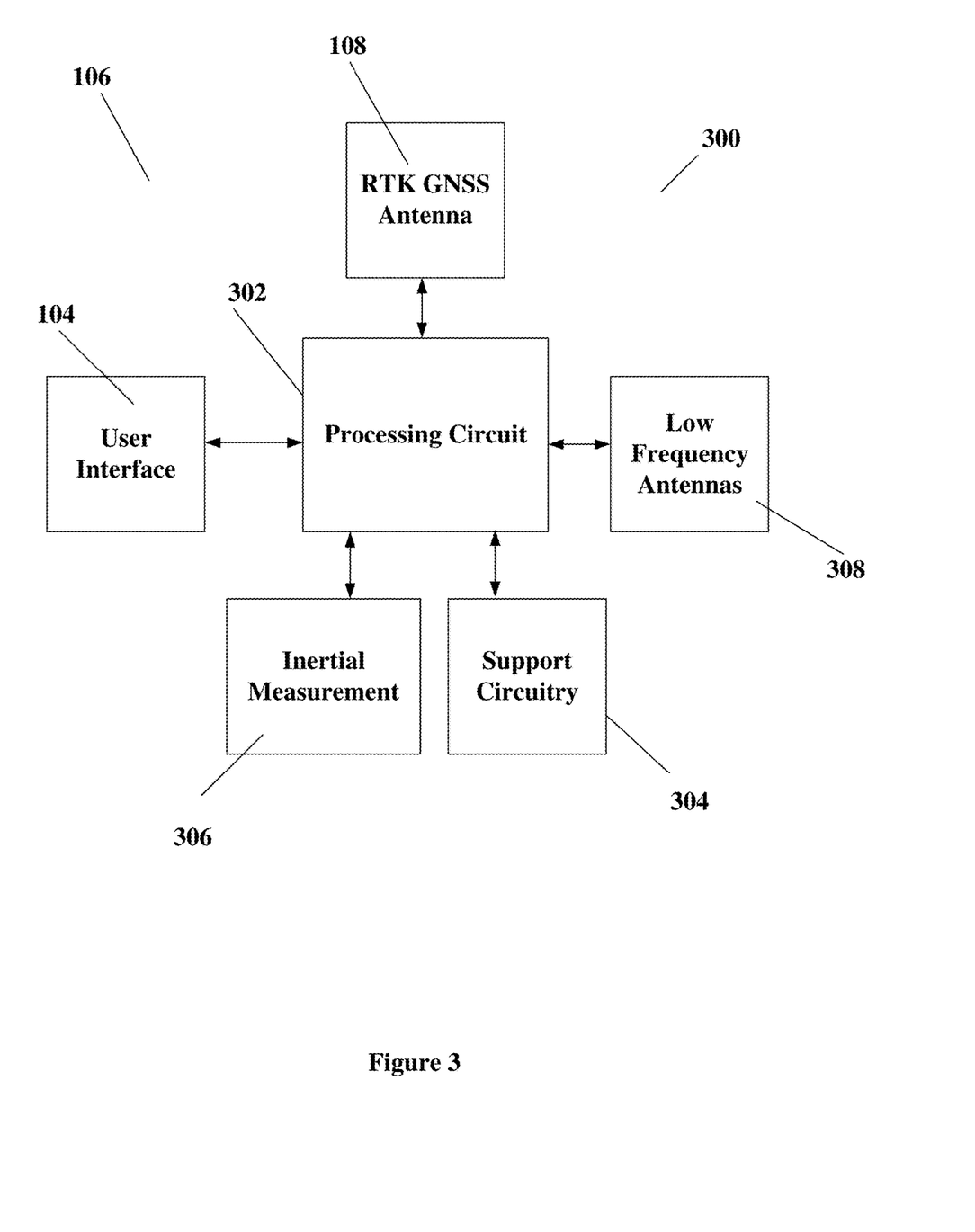
FIG. 3 illustrates a block diagram illustrating the circuitry of some embodiments of line locator as illustrated in FIG. 1.

FIG. 3 illustrates an example block diagram 300 illustrating circuitry 106 of precision line locating system 100 as illustrated in FIG. 1. As shown in FIG. 2, circuitry 106 includes a processing circuit 302. Processing circuit 302 can be any combination of electronics, memory, processors, microcomputers, microcontrollers, or other devices that receives, and process data as described below. In particular, processing circuit 302 may include at least one processor executing instructions stored in a memory. The memory includes a combination of volatile and non-volatile memory that stores instructions and data that are executed to precisely locate and map one or more underground lines 206 as described further below. During the mapping, when prompted processing circuit 302 logs locate information (depth, current, magnetic field strengths, lateral offset, etc.) from locator and logs precise position information from RTK GNSS antenna 108 over one or more positions along underground line 206 in order to store a precise mapping of the location of underground line 206. This mapping may be performed over more than one underground line to fully map utilities over a geographic area.

As illustrated in FIG. 3, processing circuit 302 receives data from user interface 104. User interface 104 can be any user interface mounted into housing 112. User interface 104 may, for example, include a display screen, which may be a touch-screen, positioned physical buttons, speakers, microphones, and/or other devices that allow processing circuit 302 to provide information to an operator of precision line locator 100 and allows the operator to input parameters. Such parameters can be used to configure operating parameters of precision line locator 100 or control display configuration operations, for example. Further, user interface 104 may allow a user to indicate marking of the underground line and the recording of a precision position as measured by RTK GNSS antenna 108. Further, user interface 104 may include an interface to another device for transmission of stored data, updating instructions stored in the memory of processing circuit 302, or performing other functions. In some embodiments, user interface 104 may include a wireless communications interface such as Bluetooth or other communications standard to perform upload and download functions of precision line locator 100. In some embodiments, physical interfaces such as, for example, USB interfaces may be utilized to download data from or upload data to precision line locator 100. In some embodiments, user interface 104 may include interfaces for wireless connection to a local area network and/or may include cell service for communications with cloud-based services, for example for mapping underground utilities.

Processing circuit 302 is also coupled to low frequency antennas circuit 308, which includes receiver antennas 202. Low frequency antenna circuit 308 can include coil antennas as receiver antennas 202 that are capable of measuring time-varying magnetic fields generated in underground line 206 as a result of the transmission of signals onto underground line 206 by transmitter 204, or by inherently carried signals in underground line 206 (e.g. power line signals). Processing circuit 302 may, in some cases, provide digital signals to control the configuration of antennas 308. Low frequency antenna circuit 308 includes circuits for receiving signals from receiver antennas 202 and providing digitized receiver signals to processing circuit 302. For example, antenna circuit 308 includes analog filtering and analog-to-digital converters that are configured to provide the digital signals. Antenna circuitry 308 then provides digitized signals indicating the magnetic field strengths from each of receiver antennas 202 to processing circuit 302.

Support circuitry 304 may include any circuitry that is further used with locator 100, for example power control circuitry or any analog-to-digital or digital-to-analog circuits, filtering of analog signals, or other actions.

In some embodiments, processing circuit 302 is coupled to an Inertial Measurement Unit (IMU) 306. IMU 306 may contain combinations of accelerometers, gyroscopes, and/or magnetometers that allow for measurement of acceleration and orientation of precision line locator 100. In general, IMU 306 may include any number of accelerometers, gyroscopes, and/or magnetometers to measure acceleration with respect to a set of axes with respect to precision line locator 100. For example, IMU 306 may include three accelerometers positioned to measure acceleration along three orthogonal axes and three gyroscopes positioned measure angular acceleration around each of the three, orthogonal axes. In some embodiments, IMU 306 may include magnetometers that measure the magnetic fields along the three orthogonal axes. The acceleration data from IMU 306 is digitally provided to processing circuit 302, which can determine the current orientation of precision position sensor 100. In some embodiments, the orientation may be determined with respect to locate axis 114 and locator axis 116.

Processing circuit 302 is also coupled to RTK GNSS antenna 108. RTK GNSS antenna 108 includes antennas and receive circuits for receiving satellite signals from satellites 210 and antennas and receive circuits for receive phase data from base station 212. In some embodiments, base station 212 and RTK GNSS antenna 108 can communicate using UHF signaling. However, any communications technique can be used to provide data to RTK GNSS antenna 108 from base station 212.

RTK techniques may involve complex calculation based on the received signals from satellites 210 and the phase data from base station 212. In some embodiments, RTK GNSS antenna 108 includes detection and processing circuits that determine the precise location of RTK GNSS antenna 108 according to the satellite signals as discussed above. In that case, RTK GNSS antenna 108 provides precise positional data to processing circuit 302. In some embodiments, RTK GNSS antenna can provide the received signals from satellites 210 and the phase data from base station 212 to processing circuit 302, where the calculation of precise location of RTK GNSS antenna 108 is calculated.

Figure 4:
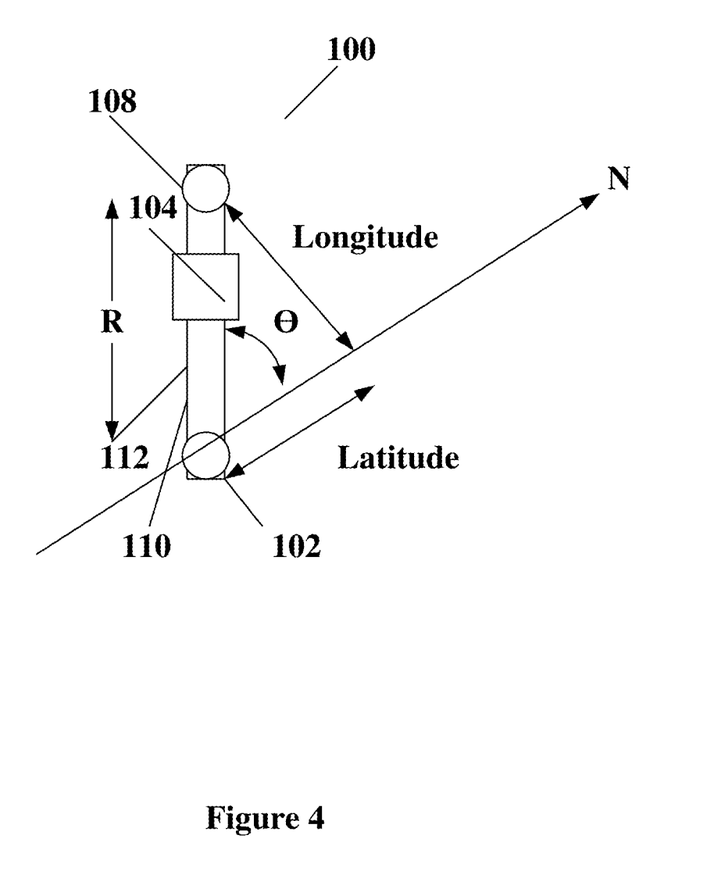
FIG. 4 illustrates a geometry illustrating correction of the precise locate position for operation of the precision line locator as illustrated in FIG. 1.

FIG. 4 illustrates the geometry of precise location measurement with the specific example of precision line locator system 100 presented in FIG. 1. FIG. 4 illustrates an orientation of precision line locator 100 with respect to true north N and positioned such that wand 102, which defines the magnetic axis, positioned vertically. In the example illustrated in FIG. 4, precision line locator 100 is held such that locator axis 114 is held vertically, usually over an underground line that has been located so that a precise location of that line can be obtained using RTK GNSS antenna 108.

As illustrated in FIGS. 1 and 4, the value R represents the separation of the locator axis 114, also referred to as the magnetic axis, to the position of the RTK GNSS antenna 108. The angle θ is the angle between the locator forward axis 116 and true North. In this example, θ is 360°—the bearing (e.g. the forward direction along locator forward axis 116). As discussed above, the locating axis 114 is defined by the low frequency antenna geometry.

As illustrated in FIG. 4, the distance R between the RTK GNSS Antenna axis and the Locating Axis 114 creates an error relative to the true grid reference, which can be at any angle with respect to orientation of precision line locator 100. As is illustrated in FIG. 4, the error in latitude and the error in longitude is defined with respect to the direction of true north N and the position of RTK GNSS 108. With locating axis 114 positioned vertically over a spot where a precise location is to be determined, the distance between RTK GNSS 108 being a distance R from locating axis 114 along locator forward axis 116, and the angle θ between true north N and locator axis θ, the error in true latitude and longitude can be calculated as follows:

Error in Latitude=$R$ cosine(360−θ);

Error in Longitude=$R$ sine(360−θ).

One solution to correct the above errors is to measure the angle θ and apply the corrections using software executed in processing circuitry 302. Such a solution assumes an accurate and reliable method of establishing a true grid angular reference. In some embodiments, IMU 306 can include a flux-gate magnetometer that can be used to measure the earth's magnetic field which is generally within a few degrees of true north (angular reference). This method can work well but cannot be regarded as reliable.

Figure 5:
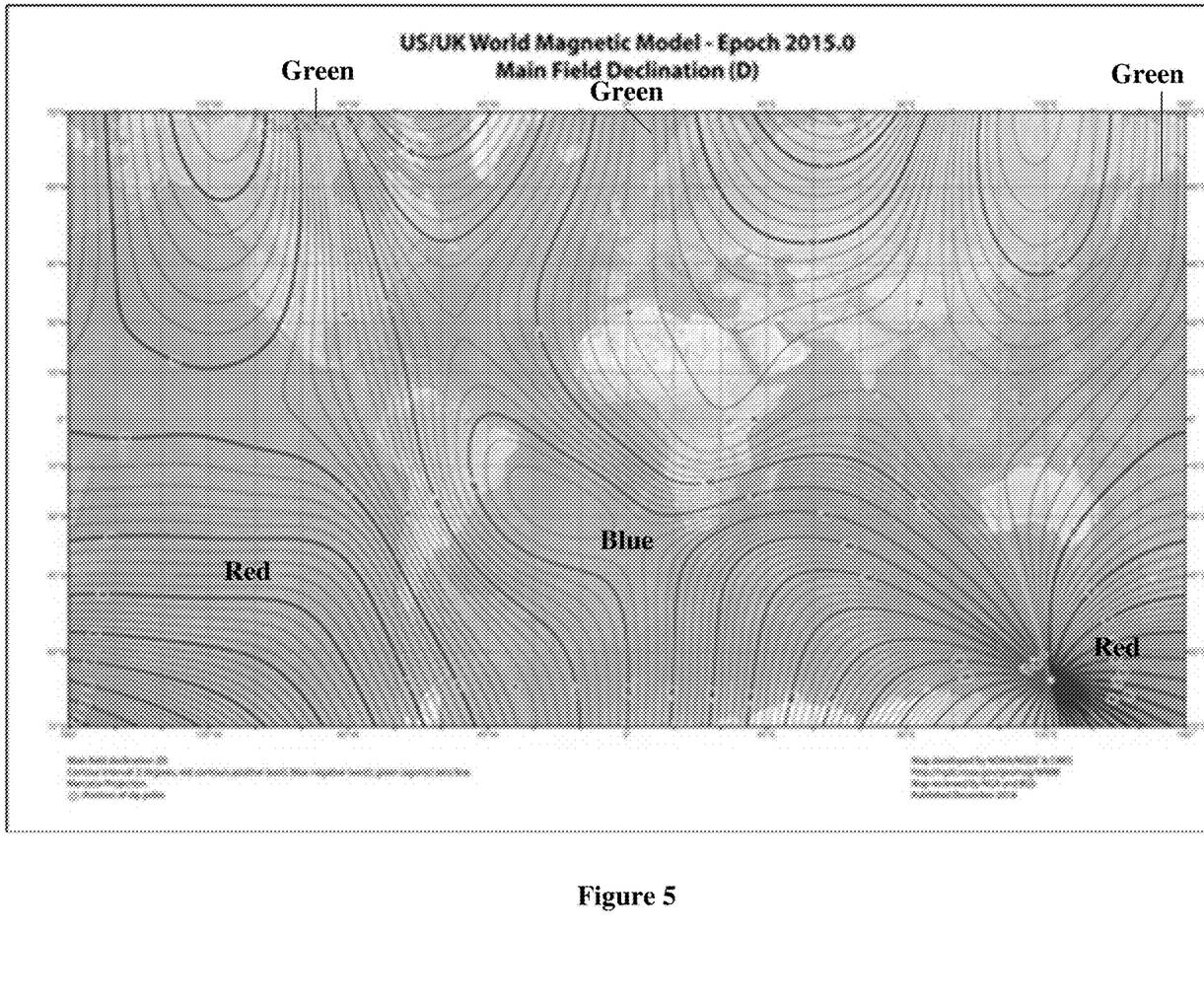
FIG. 5 illustrates the world magnetic model magnetic field declination lines.

One problem is the changes in magnetic declination. The magnetic declination refers to the angle between true north N and the magnetic north, which is the local direction of the earth's magnetic field. The magnetic declination varies significantly over the surface of the earth as is illustrated in FIG. 5. FIG. 5 illustrates a Mercator map illustrating magnetic declination isogonic lines developed by the National Oceanic and Atmospheric Administration (NOAA) with the National Geophysical Data Center (NGDC) and the Cooperative Institute for Research in Environmental Sciences (CIRES). Contour line intervals are 2 degrees where lines marked "red" represent positive declinations (eastward), "blue" represents negative declinations (westward) and "green" are zero declination lines.

Further, local variations caused by parked vehicles and other iron structures can cause an angular measurement error of up to 180°. Embodiments of the present invention provide a simple method to solve the above problems allowing line locator system 100 to combine accurate utility location with cm accurate geo-spatial data using RTK with RTK GNSS antenna 108.

Figure 6:
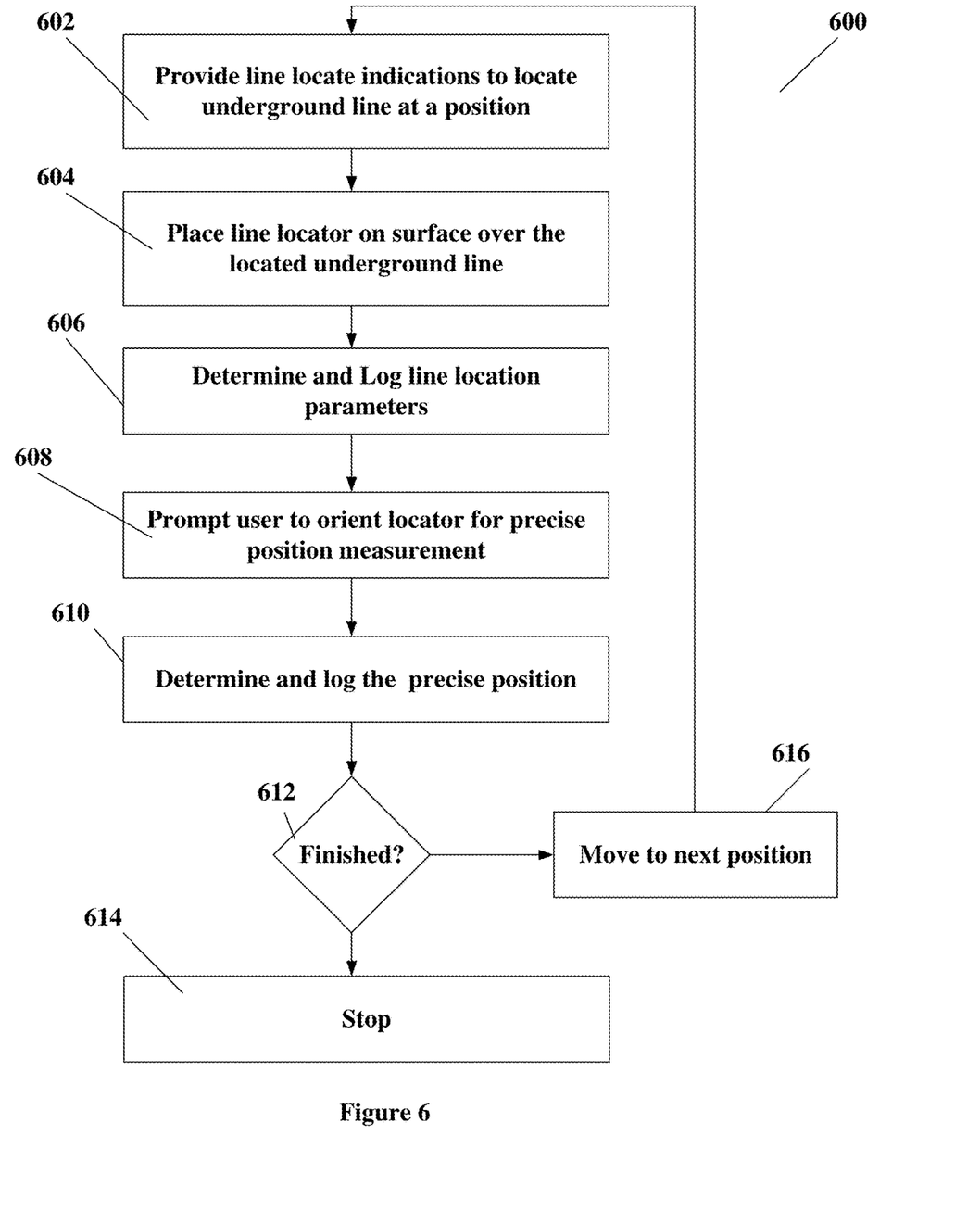
FIG. 6 illustrates a flow chart for operation of a precise line locator system according to some embodiments of the present invention.
Figure 7A:
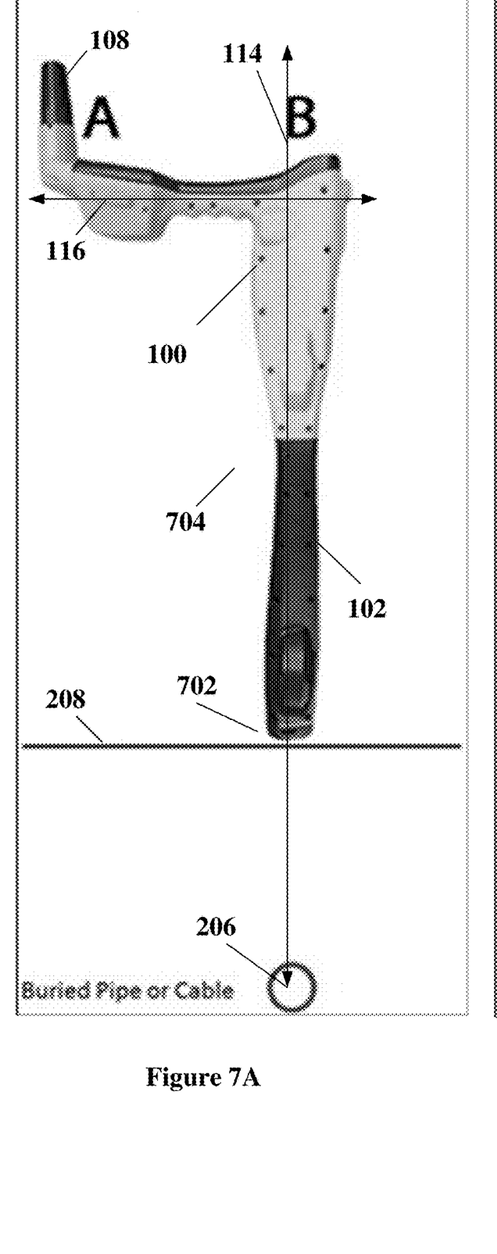
FIGS. 7A and 7B illustrate operational orientation of the precise line locator as illustrated in FIG. 1.
Figure 7B:
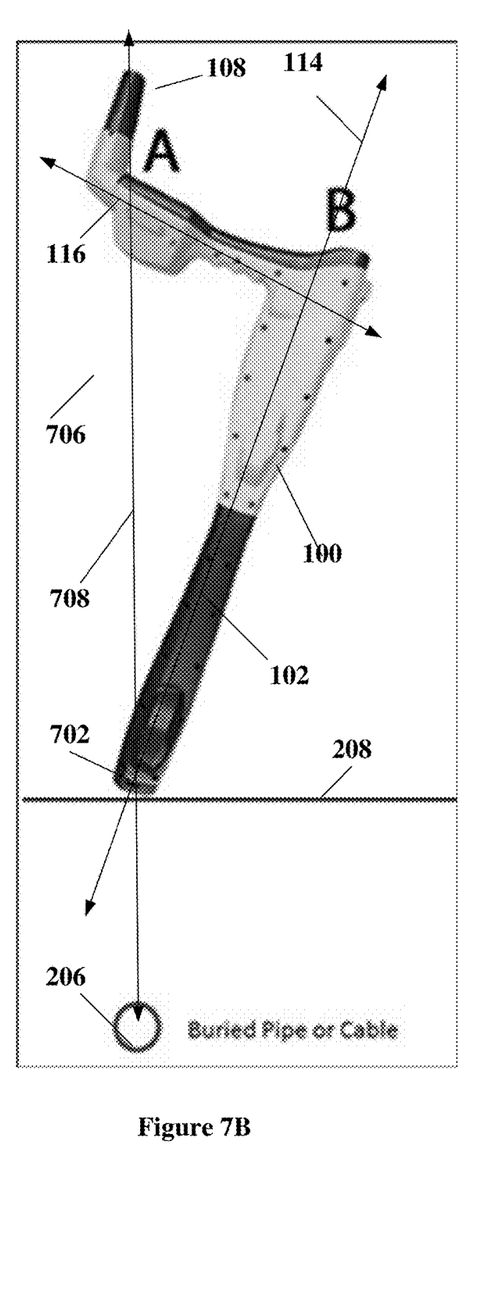

FIG. 6 illustrates a method 600 of operating an embodiment of precise line locator 100 to log and store data regarding the position of an underground line 206 over a geographic area to form a map. Some embodiments as described here present a simple but accurate method that corrects the intrinsic errors described above. As discussed above, the locate position is defined with respect to the electro-magnetic locate axis 114, which is defined by antennas 202 in wand 102 of precision line locator 100. FIGS. 7A and 7B illustrate how precision line locator 100 can be operated during various steps of method 600 in order to first locate and log location data regarding underground line 206 with respect to precision line locator 100 and then to reorient precision line locator 100 to obtain and log a precise position of line locator 100 with RTK GNSS antenna 108.

As indicated in FIG. 6, in step 602 precision line locator 100 is operated as a line locator used to locate the position of underground line 206 using antennas 202. Line locator 100 may precisely locate the position of underground line 206 relative to precision line locator 100. Once underground line 206 is located with precision line locator 100, line locator 100 is placed in a first orientation 704 over underground line 206 in step 604.

FIG. 7A illustrates orientation 704 of step 604, where bottom 702 is placed on ground surface 208 and locate axis 114 is positioned to be vertical. Orientation 704 is used to provide accurate location of underground line 206 by precision line locator 100 using antennas 202 in wand 102. In operation, users place a bottom 702 of wand 102 at ground level 208 and align locator axis 114 vertically to eliminate any offset errors in the determination of the position of underground line 206 with respect to precision line locator 100.

Once the locate position is defined in orientation 704, in step 606 locate information is logged. Typically, the logging at this stage causes an array of electro-magnetic measurements to be recorded in memory of processing circuit 302. These measurements may include, for example, the depth of line 206, the current through line 206 as measured by locator 100, a lateral offset indicating that locate axis 114 is not directly over underground line 206, and fault measurements of the utility relative to the line locating system 100. Logging in step 606 may occur when precise line locator 100 determines that it is in orientation 704 or when prompted on user interface 104 by the user.

Once the locate information is logged in step 606, in step 608 precision line locator 100 prompts the user to position locator 100 for recordation of precise position data. FIG. 7B illustrates an orientation 706 that allows for precise measurement of the position of underground line 206 using RTK GNSS antenna 108. In orientation 706, the user is prompted to tilt precision line locator 100 backwards as indicated in FIG. 7B until RTK GNSS antenna 108 is aligned with vertical axis 708, which extends vertically through bottom 702. At the point the RTK GNSS Antenna 108 is directly over the locate position, the RTK geo-spatial position can be measured and appended to the measurement log with the locate measurement data discussed above in step 610.

In orientation 706, RTK GNSS antenna 108 and the defined locate position are now in the same vertical line, the error caused by the offset displacement R is eliminated. Consequently, the value R in the above correction equations can be set to 0 in the correction equations described above. In other words, RTK GNSS 108 has been brought into line with where locator axis 114 was during the locate operation and consequently the value of R is reduced to 0 in the correction calculation.

In step 612, method 600 determines whether or not data is to be logged for any more positions. If not, then precision line locator 600 is stopped in step 614. If so, then precision line locator 600 is moved to the next position in step 616 and method 600 returns to step 602. In that fashion, a mapping of locate data and precise position data for a number (1 or more) of positions is stored in the memory of processing circuit 302. Each logged data can be used to determine the precise position of underground line 206 at each of these positions because the geometry of precise line locator 100 itself is well defined. Calculation of the precise position of underground line 206 at each position can be performed from the log data at a later time, or in some embodiments may be performed by processing circuit 302.

Figure 8:
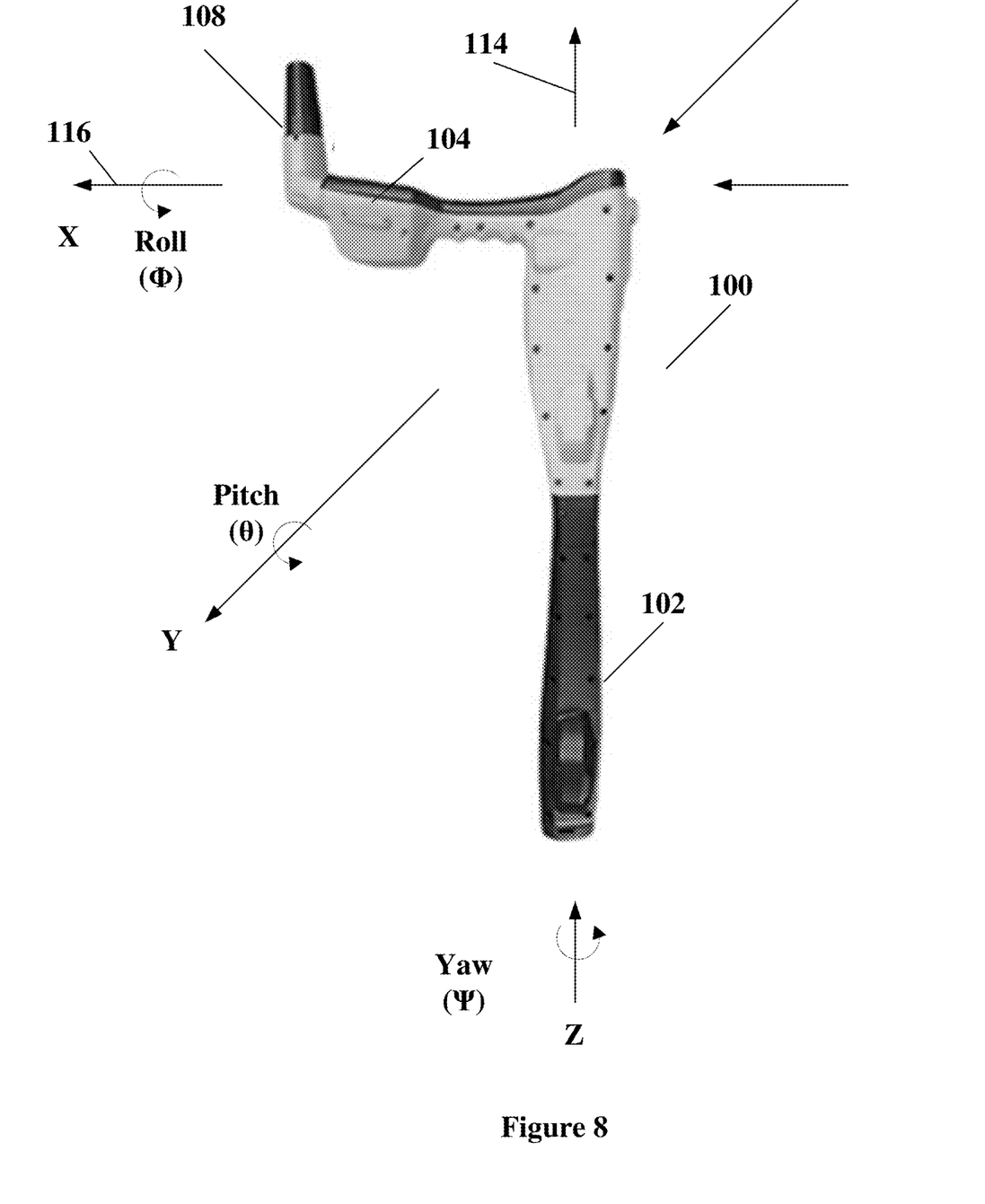
FIG. 8 illustrates operation of an inertial measurement unit that can be included in some embodiments of line locator as illustrated in FIG. 1.

In some embodiments, an inertial measurement unit (IMU) 306 may be included. IMU 306 may be a useful feature to provide guidance in positioning precision line locator 100 in position 704 of FIG. 7A or 706 of FIG. 7B. In some examples, IMU 306 may include combined MEMs gyro and accelerometer. IMU 306, under control of processing circuit 302, yields real-time measurements of roll, pitch and yaw as illustrated in FIG. 8. In some embodiments, the update rate is typically 26 Hz (100 Hz max) and the measurement accuracy is typically within ±1°.

As illustrated in FIG. 8, IMU 306 inertially measures acceleration along locate axis 114 (the Z direction), forward locate axis 116 (the X direction), and the Y direction perpendicular to the Z direction and the X direction. IMU 306 further measures angular rotational acceleration around each of axis X, Y, and Z. IMU 306 further includes gyros that measure rotational acceleration around the X axis (Roll 1), rotational acceleration around the Y axis (Pitch θ), and rotational acceleration around the Z axis (Yaw ψ). Processing circuitry 302 receives the acceleration data from IMU 306 and can calculate the orientation of precise line locator 100.

In some embodiments, the measured angles may be referenced to the locator user interface 104 display, which is featured into the handle at the top of the locator as indicated in FIG. 1. It is therefore possible to sense the exact point in which the locate position and the RTK-GNSS Antennas are vertically collinear. The actual offset (mainly the pitch angle) is defined by the physical dimensions of precise locator 100 and is both fixed and known.

Figure 9:
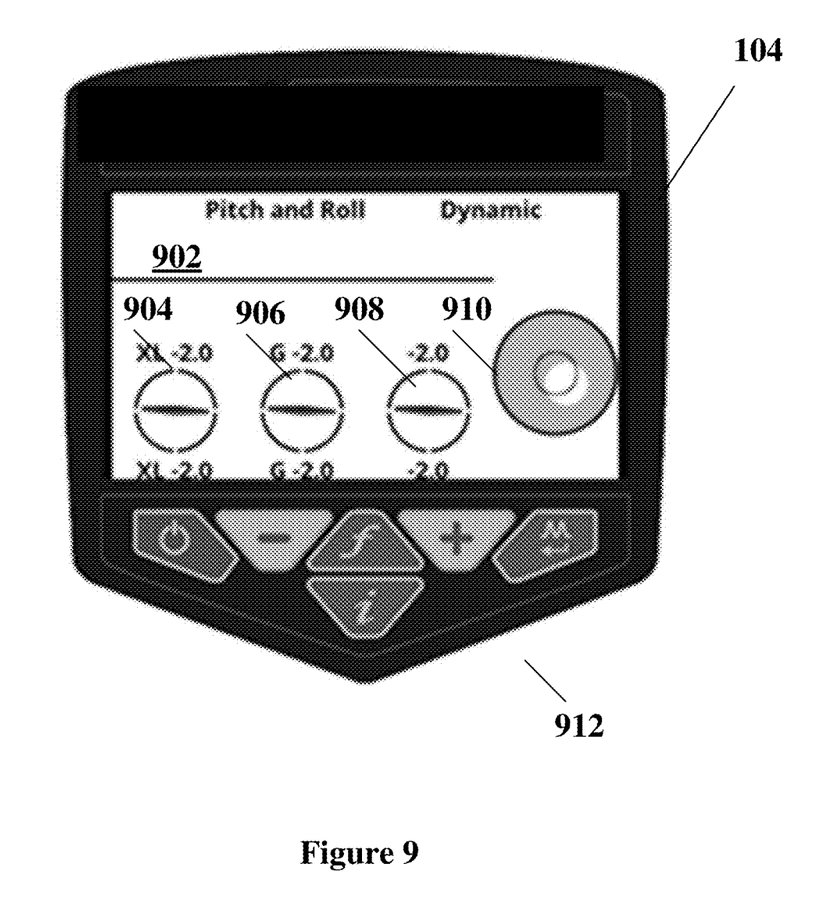
FIG. 9 illustrates a user interface illustrating measurement of the Roll, Tilt, and Yaw measured in some embodiments of the precision line locator as illustrated in FIG. 1 that includes an inertial measurement unit.

In some embodiments, guidance in the alignment process can be provided on user interface 104 as illustrated in FIG. 9. As is illustrated in FIG. 9, user interface 104 includes a display 902 that can show the angle compensation according to user settings (off, dynamic, fixed). Display 902 is currently illustrating the dynamic user setting. When angle compensation is "Dynamic" roll and pitch are updated according to the live measurements from IMU 306. FIG. 9 shows the pitch and roll as calculated from 3D accelerometers (XL) in indicator 904, 3D gyroscopes (G) as indicated in indicator 906 and the combined XL & G pitch and roll values as indicated in indicator 908, as described above. Further, a spirit level 910 demonstrates alignment of the locator axis 114 with respect to gravity. Further, user interface 104 can include user input buttons 912 to control operation of precise locator 100. In some embodiments, spirit level 910 may be computer generated or a mechanical level. Spirit level 910 may be arranged to indicate positioning in orientation 704 of FIG. 7A and later positioning in orientation 706 illustrated in FIG. 7B.

Although user interface 104 may be arranged or distributed differently as illustrated in FIG. 9, some embodiments can include the 'spirit-level' widget 910 to alert the user that the exact RTK position of alignment has been reached. This alert also causes the exact position to be measured allowing this data to be appended to the standard survey map data as discussed above. In some embodiments, spirit-level widget 910 may display a first level for alignment in orientation 704 as illustrated in FIG. 7A and display a second level for alignment in orientation 706 as illustrated in FIG. 7B.

In some embodiments, it may be found that it is not necessary to move the locator to the exact point of collinearity. Given that the 3 inertial measurements of roll, pitch and yaw are continuously updating and that there is a known trigonometric relation between the locator's electro-magnetic axis and the RTK Antenna it can be reasoned that a smaller displacement is adequate. Displacements from ideal positioning can be corrected by calculation in processing circuit 302 based on data from IMU 306.

The above detailed description is provided to illustrate specific embodiments of the present invention and is not intended to be limiting. Numerous variations and modifications within the scope of the present invention are possible. The present invention is set forth in the following claims.

What is claimed is:

1. A precise line locator, comprising:
  a housing;
  a wand attached to the housing, the wand including an array of low frequency antennas arranged along the wand, the array of low frequency antennas defining an electromagnetic locate axis of the line locator system;
  a real-time kinematic (RTK) Global Navigation Satellite (GNSS) antenna attached to the housing;
  a user interface positioned in the housing; and
  a processing circuit coupled to the array of low frequency antennas, the RTK GNSS antenna, and the user interface,
  wherein the underground line locator determines locate data of the underground line based on signals from the array of low frequency antennas and determines a precise position of the underground line locator from the RTK GNSS antenna,
  wherein the housing defines a forward locate axis that is perpendicular to the electromagnetic locate axis and along which a user handgrip is formed and the user interface and the RTK GNSS antenna are attached, the RTK GNSS antenna being separate from the electromagnetic locate axis.

2. The precise line locator of claim 1, wherein the processing circuit logs the locate data and the precise position one or more position points of the underground line.

3. The precise line locator of claim 1, wherein the locate data is determined with the precise line locator in a first orientation and where the precise position is determined with the precise line locator in a second orientation.

4. The precise line locator of claim 3, wherein the first orientation is achieved with the electromagnetic locate axis aligned with a vertical line and with a bottom of the wand resting on a ground over the underground line.

5. The precise line locator of claim 4, wherein the second orientation is achieved with the bottom of the wand remaining on the ground over the underground line and the RTK GNSS antenna positioned along the vertical line.

6. The precise line locator of claim 3, wherein the processing circuit executes instructions stored in a memory to
  locate the underground line with the array of low frequency antennas;
  determine and log locate data when the line locator is in the first orientation; and
  determine and log the precise position with the locate data.

7. The precise line locator of claim 3, further including an inertial measurement unit.

8. The precise line locator of claim 7, wherein data from the inertia measurement unit is displayed on the user interface to assist placement of the line locator in the first orientation and the second orientation.

9. The precise line locator of claim 8, further including one or more spirit level displays to assist placement of the line locator in the first orientation and/or the second orientation.

10. A method of precisely determining position of an underground line, comprising:
  locating an underground line at a position with a precise line locator, the precise line locator having an array of low frequency antennas arranged along a wand, the array of low frequency antennas defining an electromagnetic locate axis;
  placing the precise line locator in a first orientation;
  determining and logging line location data;
  placing the precise line locator in a second orientation where a real-time kinematic (RTK) Global Navigation Satellite (GNSS) antenna is positioned to provide a precise position; and
  determining and logging the precise position with the line location data.

11. The method of claim 10, further including producing a map of the underground line by logging the line location precision position at a plurality of positions.

12. The method of claim 10, wherein the wand is attached to a housing that defines a forward locate axis that is perpendicular to the electromagnetic locate axis and along which a user handgrip is formed and a user interface and the RTK GNSS antenna are attached, the RTK GNSS antenna being separate from the electromagnetic locate axis.

13. The method of claim 12, wherein the first orientation is achieved with the electromagnetic locate axis aligned with a vertical line and with a bottom of the wand resting on a ground over the underground line.

14. The method of claim 13, wherein the second orientation is achieved with the bottom of the wand remaining on the ground over the underground line and the RTK GNSS antenna positioned along the vertical line.

15. The method of claim 12, wherein placing the precise line locator in the first orientation includes indicating the first orientation on the user interface based on data received from an inertial measurement unit.

16. The method of claim 12, wherein placing the precise line locator in the second orientation includes indicating the second orientation on the user interface based on data received from an inertial measurement unit.

17. The method of claim 12, wherein placing the precise line locator in the first orientation includes indicating the first orientation on the user interface based on data received from a spirit level.

18. The method of claim 12, wherein placing the precise line locator in the second orientation includes indicating the second orientation on the user interface based on data received from a spirit level.

* * * * *